(12) United States Patent
Kikuchi et al.

(10) Patent No.: US 7,258,578 B2
(45) Date of Patent: Aug. 21, 2007

(54) CARD CONNECTOR WITH LOCKING MECHANISM

(75) Inventors: Hitoshi Kikuchi, Koto-ku (JP);
Hirokazu Takahashi, Koto-ku (JP)

(73) Assignee: DDK, Ltd., Tokyo (JP)

( * ) Notice: Subject to any disclaimer, the term of this patent is extended or adjusted under 35 U.S.C. 154(b) by 0 days.

(21) Appl. No.: 11/141,673

(22) Filed: May 31, 2005

(65) Prior Publication Data

US 2005/0266715 A1    Dec. 1, 2005

(30) Foreign Application Priority Data

May 31, 2004  (JP) .............................. 2004-161293
Oct. 22, 2004  (JP) .............................. 2004-307794

(51) Int. Cl.
*H01R 24/00*   (2006.01)
*H01R 13/44*   (2006.01)

(52) U.S. Cl. ...................................... 439/630; 439/143

(58) Field of Classification Search ................ 439/159, 439/630, 138, 139, 140, 143, 145; 235/483, 235/486, 675
See application file for complete search history.

(56) References Cited

U.S. PATENT DOCUMENTS 6,869,017 B2 *   3/2005   Yamaguchi ................. 235/483
6,955,566 B2 *  10/2005   Matsunaga et al. ......... 439/630
2003/0119365 A1 *  6/2003   Watanabe et al. ........... 439/630
2005/0003711 A1 *  1/2005   Chang ........................ 439/630
2006/0014436 A1 *  1/2006   Wu ............................. 439/630
2006/0025019 A1 *  2/2006   Zhu et al. ................... 439/630
2006/0089051 A1 *  4/2006   Ko ............................. 439/630

* cited by examiner

*Primary Examiner*—Chandrika Prasad
(74) *Attorney, Agent, or Firm*—Baker Botts LLP

(57) ABSTRACT

A card connector includes a required number of contacts adapted to contact connection portions of the plurality of the memory cards, and a case arranging and holding the contacts therein and having a plurality of inserting holes for the memory cards. The connector includes at least one locking member movable or pivotally movable when a memory card is inserted, and at least one spring member displaceable when the memory card is inserted. In one aspect, a card connector includes at least one slider for forming parts of the plurality of inserting holes, and at least one holder for movably holding the slider. Consequently, the card connector is able to prevent the insertion of more than one memory card with a simple construction, to provide a miniaturized and high-density connector without any limitation of circuit board design, and easy to design its case and easy to remove the inserted card.

12 Claims, 9 Drawing Sheets

CARD CONNECTOR WITH LOCKING MECHANISM

CROSS-REFERENCE TO RELATED APPLICATIONS

This application claims priority from Japanese Patent Application No. 2004-307,794, filed Oct. 22, 2004, and Japanese Patent Application No. 2004-161,293, filed May 31, 2004, each of which are incorporated by reference in their entireties herein, and from which priority is claimed.

BACKGROUND OF THE INVENTION

This invention relates to a card connector for use in a various kinds of electric and electronic appliances such as printers, card readers and the like and capable of inputting and outputting signals into and from a plurality of memory cards inserted into the card connector, and more particularly to a card connector capable of preventing more than one memory card from being inserted at a time.

In recent years, with the widespread use of digital cameras and the like, memory cards of compact and large memory capacity have been used. Depending upon characteristics of appliances with which the memory cards are utilized, memory cards of variety of kinds have become popular such as, for example, SD (Secure Digital) memory card (registered trademark) (simply referred to hereinafter as "SD card"), Memory-Stick card (registered trademark) (simply referred to hereinafter as "MS card"), SmartMedia card (registered trademark) (simply referred to hereinafter as "SM card"), CompactFlash card (registered trademark) (simply referred to hereinafter as "CF card"), xD card (registered trademark), multimedia card (registered trademark) (simply referred to hereinafter as "MM card") and the like. With these circumstances, memory card readers and writers as devices for reading and writing information from and onto these various memory cards have been used in computers or as external or peripheral devices.

It is naturally preferable that such memory card readers and writers can also accommodate these various memory cards. In the hitherto used memory card readers and writers, therefore, there is arranged a card connector in their main body to make it possible to insert various memory cards into the connector, thereby enabling writing and reading information onto and from these memory cards.

There are many kinds of memory cards such as SD, MS, SM, CF, xD, MM cards and the like described above. The memory card readers and writers could accommodate all or some of these memory cards. In fact, card connectors are provided with inserting holes into which corresponding memory cards can be inserted. Now, a card connector adapted to accommodate three kinds of the SD, xD and MS cards will be explained by way of example with reference to FIGS. 6 and 7.

A card connector 60 of the prior art shown in FIGS. 6 and 7 includes a plurality of contacts 63 arranged and held in a housing or a case 62 such that the contacts 63 are able to be connected to terminals of memory cards inserted into respective inserting holes. In this case, the card connector is constructed such that when a memory card is inserted into the inserting hole through its opening, it becomes possible to write and read information onto and from the memory card. As shown in FIG. 7, the card connector 60 includes an inserting hole 27 in the upper portion for an SD card 49, an inserting hole 26 on the left side in the lower portion for an MS card 48, and an inserting hole 25 on the right side in the upper portion for an xD card 47.

With such a card connector, a desired memory card, for example, the CF card is inserted into the inserting hole for the CF card to carry out writing and reading information onto and from the CF card. In a card connector into which a plurality of memory cards can be inserted, integrated circuits for controlling the respective memory cards are common to all the memory cards. When two or more memory cards are inserted into the card connector at a time, errors would frequently occur. Two methods are envisioned in order to avoid these errors. One method is to provide integrated circuits exclusive to the respective memory cards for controlling these cards. The other method is to prevent the insertion of more than one memory card at a time. The former method would be difficult to be realized because of extremely packed substrate layouts and occupied areas of substrates with the current progressed miniaturization of appliances and would result in increase of manufacturing cost.

As an example of the latter method, consequently, disclosed in the art is a card connector having a plurality of inserting holes and planned to prevent a further insertion of a memory card when once a memory card has been inserted, such as Japanese Patent Application Opened No. 2003-297, 489 (Patent Literature 1).

The invention of the Japanese Patent Application Opened No. 2003-297,489 (Patent Literature 1) has an object to provide a memory card connector having a plurality of inserting holes into which a plurality of memory card can be inserted, but being capable of preventing a second memory card from being inserted by an earlier insertion of a first memory card. This memory card connector includes a connector main body having a plurality of inserting holes opening into shapes corresponding to those of memory cards to be inserted and contacts provided in spaces of the inserting holes to be electrically connected to respective electrodes of the cards to be inserted, and a slide cover provided outside the inserting holes in a movable manner along the opening surface of the inserting holes and having card inserting holes of shapes corresponding to the memory cards, the card inserting holes opening in a manner forming pairs with and shifting relative to the inserting holes of the connector main body. With this construction, accordingly, when the space of one inserting hole of the connector main body and the card inserting hole of the slider cover are concentrically coincident with each other, the spaces of the other inserting holes of the main body and the other card inserting holes of the slide cover are not coincident with each other, thereby preventing the insertion of more than one memory card at a time. The claim in the Patent Literature 1 recites a memory card connector into which a plurality of memory cards can be inserted, characterized in comprising a connector main body consisting of a plastic housing or case having a plurality of inserting holes opening into shapes corresponding to those of memory cards to be inserted and contacts provided in spaces of the inserting holes to be electrically connected to electrodes of the cards to be inserted, and a slide cover provided outside the inserting holes of the connector main body in a movable manner along the opening surface of the inserting holes of the connector main body and having card inserting holes of shapes corresponding to the memory cards to be inserted and opening in a manner forming pairs with the inserting holes of the connector main body, whereby when the space in one inserting hole of the connector main body and the card inserting hole of the slide cover in pair are concentrically coincident with each other, other spaces of the other inserting holes and the opposite card inserting holes are not coincident with each other.

In the card connector of the Patent Literature 1, the slide cover as a separate part is attached to the surface of the case and is laterally slid such that only one card inserting hole of the slide cover is brought into coincidence with the one inserting hole of the case and the other card inserting holes are not coincident with the other inserting holes of the case, thereby preventing the insertion of more than one memory card at a time.

In recent years, the requirement for even more miniaturization has been more strongly imposed on appliances and hence the same requirement has also been strongly imposed on connectors. Under such circumstances, the arrangement of the slide cover on the front surface of the connector in the Patent Literature 1 would go against the miniaturization of connector, and would limit circuit substrate design (making it impossible to arrange connection portions of the connector to a substrate on the side of fitting with a mating connector) and inhibit the high-density arrangement for accommodating a plurality of memory cards.

In order to cause the slide cover to slide on the surface of the case, moreover, the front surface of the case must extend onto the side inserting the memory cards, which makes it structurally difficult to design the connector case and results in deteriorated shielding effect.

With the construction of the card connector of the Patent Literature 1, moreover, the slide cover as a separate part is arranged on the surface of the case so that when removing a memory card from the card connector, the part of the card to be grasped or seized by an operator would be reduced, making it difficult to remove the card from the connector.

SUMMARY OF THE INVENTION

It is an object of the invention to provide an improved card connector which eliminates all the disadvantages of the prior art described above and which is able to prevent the insertion of a further card with a simple construction when a first card has been inserted, to achieve a miniaturized and high-density connector without any limitation of circuit board design, and easy to design its case and easy to remove the inserted card.

The object of the invention above described can be accomplished by a card connector 10 into which a plurality of memory cards are removably inserted, including a required number of contacts 13 adapted to contact connection portions of the plurality of the memory cards 45, and a case 12 arranging and holding the contacts 13 therein and having a plurality of inserting holes 23 into which the plurality of memory cards 45 are inserted, respectively, wherein according to the invention, the card connector comprises at least one locking member 20 provided at a predetermined position in the case 12 to be movable or pivotally movable when a memory card 45 of one kind is inserted, and at least one spring member 18 provided at a predetermined position in the case 12 to be displaceable when the memory card 45 of the one kind is inserted, thereby preventing more than one memory card from being inserted into the card connector by means of the locking member 20 and the spring member 18.

In the case having three inserting holes, the object described above can be achieved by a card connector 10 into which a plurality of memory cards 45 are removably inserted, including a required number of contacts 13 adapted to contact connection portions of the plurality of the memory cards 45, and a case 12 arranging and holding the contacts 13 therein and having a plurality of inserting holes 23 into which the plurality of memory cards 45 are inserted, respectively, wherein according to the invention, the case 12 comprises two inserting holes 23 arranged substantially side by side and one inserting hole 23 arranged above the two inserting holes, and the case further comprises a locking member 20 provided at an intermediate position of the two inserting holes to be movable or pivotally movable when a memory card 45 is inserted into either of the two inserting holes 23, and a spring member 18 provided at a position below the one inserting hole 23 arranged above the two inserting holes 23 to be displaceable when a memory card 45 is inserted into the one inserting hole 23, thereby preventing more than one memory card 45 from being inserted into the card connector by means of the locking member 20 and spring members 18.

In a preferred embodiment, when a memory card 45 is inserted into either of the inserting holes 23 of the case 12, the locking member 20 is moved or pivotally moved to extend into the inserting hole 23 arranged in the side by side relationship to the inserting hole 23 into which the memory card has been inserted so that the spring member 18 is prevented from being displaced by means of the locking member 20, thereby preventing more than one memory card 45 from being inserted into the card connector.

In another embodiment, when a memory card 45 is inserted in either of the inserting holes 23 of the case 12, the spring member 18 is displaced so that parts of the displaced spring member 18 extend into other inserting holes 23, thereby preventing more than one memory card 45 from being inserted into the card connector. Moreover, the inserting holes 23 have a common portion to other inserting holes 23, if required.

Moreover, the object of the invention can be achieved by a card connector 10 into which a plurality of memory cards 50 are removably inserted, including a plurality of contacts 13 adapted to contact connection portions of the plurality of the memory cards 50, and a case 12 arranging and holding the contacts 13 therein and having a plurality of inserting holes 122 into which the plurality of memory cards 50 are inserted, respectively, wherein according to the invention, the card connector comprises a required number of sliders 120 arranged at predetermined positions in the case 12 for forming parts of the plurality of inserting holes 122, and a required number of holders 118 arranged at predetermined positions in the case 12 for movably holding the sliders 120, thereby preventing more than one memory card 50 from being inserted into the card connector by means of the sliders 120.

In the case having five inserting holes 122, the object described above can be accomplished by a card connector 10 into which a plurality of memory cards 50 are removably inserted, including a plurality of contacts 13 adapted to contact connection portions of the plurality of the memory cards 50, and a case 12 arranging and holding the contacts 13 therein and having a plurality of inserting holes 122 into which the plurality of memory cards 50 are inserted, respectively, wherein according to the invention, the case 12 comprises four inserting holes 122 arranged side by side and one above the other and one inserting hole 122 arranged below and at an intermediate position of the four inserting holes 122, and the case 12 further comprises a required number of sliders 120 arranged substantially at an intermediate position of the four inserting holes 122 arranged side by side and forming parts of the five inserting holes 122, and a holder 118 for movably holding the slider 120, thereby preventing more than one memory card 50 from being inserted into the card connector by means of the slider 120.

In a preferred embodiment, a combination of the recesses 130 and the protrusion 132 forms the parts of the inserting holes 122. Moreover, four recesses 130 form the parts of the four inserting holes 122 arranged side by side and one above the other, and one protrusion 132 forms the part of the inserting hole 122 arranged below the four inserting holes 122. Further, the front end of the holder 118 is divided into pieces which are alternately bent in opposite directions, and the slider 120 is formed with an inserting aperture 128 into which the holder 118 is inserted such that the slider 120 is movably held.

In another embodiment, the front end of the holder 118 is divided into three pieces which are alternately bent in opposite directions, and the slider 120 is formed with a longitudinally elongate inserting aperture 128 into which the holder 118 is inserted such that the slider 120 is held movably in its longitudinal direction (direction of the thickness of the connector). Further, a combination of the recesses 130 and the protrusion 132 formed in the slider 120 forms the parts of the inserting holes 122 for memory cards 50 so that when the slider 120 is moved by inserting one memory card 50 into one inserting hole 122, any memory card cannot be inserted into any other inserting holes 122.

As can be seen from the above explanation, the card connector 10 according to the invention can bring about the following significant effects.

(1) According to the invention, the card connector comprises at least one locking member 20 provided at a predetermined position in the case 12 to be movable or pivotally movable when a memory card 45 of one kind is inserted, and at least one spring member 18 provided at a predetermined position in the case 12 to be displaceable when the memory card 45 of the one kind is inserted, thereby preventing the insertion of more than one memory card into the card connector by means of the locking member 20 and the spring member 18. In this manner, as the insertion of more than one memory card 45 can be prevented with great certainty, no errors occur in integrated circuits for controlling the memory cards 45, and the card connector according to the invention can be designed without any limitation in circuit board design and without any obstacle in high-density construction and is easy to design the case and easy to remove memory card.

(2) According to the invention, the case 12 comprises two inserting holes 23 arranged substantially side by side and one inserting hole 23 arranged above the two inserting holes, and the case further comprises a locking member 20 provided at an intermediate position of the two inserting holes to be movable or pivotally movable when a memory card 45 is inserted into either of the two inserting holes 23, and a spring member 18 provided at a position below the one inserting hole 23 arranged above the two inserting holes 23 to be displaceable when a memory card 45 is inserted into the one inserting hole 23, thereby preventing the insertion of more than one memory card 45 into the card connector by means of the locking member 20 and spring members 18. In this manner, as the insertion of more than one memory card 45 can be prevented with great certainty, no errors occur in integrated circuits for controlling the memory cards 45, and the card connector according to the invention can be designed without any limitation in circuit board design and without any obstacle in high-density construction and is easy to design the case and easy to remove memory card.

(3) According to the invention, when a memory card 45 is inserted into either of the inserting holes 23 of the case 12, the locking member 20 is moved or pivotally moved to extend into the inserting hole 23 arranged in the side by side relationship to the inserting hole 23 into which the memory card has been inserted so that the spring member 18 is prevented from being displaced by means of the locking member 20, thereby preventing the insertion of more than one memory card 45 into the card connector. Therefore, as the insertion of more than one memory card 45 can be prevented with a simple construction with great certainty, no errors occur in integrated circuits for controlling the memory cards 45, and circuit board design and case design can be easily performed without any objection.

(4) According to the invention, when a memory card 45 is inserted in either of the inserting holes 23 of the case 12, the spring member 18 is displaced so that parts of the displaced spring member 18 extend into other inserting holes 23, thereby preventing the insertion of more than one memory card 45 into the card connector. Consequently, as the insertion of more than one memory card 45 can be prevented with a simple construction with great certainty, no errors occur in integrated circuits for controlling the memory cards 45, and circuit board design and case design can be easily performed without any objection.

(5) According to the invention, the inserting holes 23 have a common portion to other inserting holes 23, if required. Therefore, the card connector according to the invention accommodate many kinds of memory cards 45 without enlarging the connector.

(6) In the card connector 10 into which a plurality of memory cards 50 are removably inserted, including a plurality of contacts 13 adapted to contact connection portions of the plurality of the memory cards 50, and a case 12 arranging and holding the contacts 13 therein and having a plurality of inserting holes 122 into which the plurality of memory cards 50 are inserted, respectively, according to the invention the card connector comprises a required number of sliders 120 arranged at predetermined positions in the case 12 for forming parts of the plurality of inserting holes 122, and a required number of holders 118 arranged at predetermined positions in the case 12 for movably holding the sliders 120, thereby preventing the insertion of more than one memory card 50 into the card connector by means of the sliders 120. In this manner, as the insertion of more than one memory card 50 can be prevented with a simple construction with great certainty, no errors occur in integrated circuits for controlling the memory cards 50, and the card connector according to the invention can be designed without any limitation in circuit board design and without any obstacle in high-density construction and is easy to design the case and easy to remove memory card 50.

(7) In a card connector 10 into which a plurality of memory cards 50 are removably inserted, including a plurality of contacts 13 adapted to contact connection portions of the plurality of the memory cards 50, and a case 12 arranging and holding the contacts 13 therein and having a plurality of inserting holes 122 into which the plurality of memory cards 50 are inserted, respectively, according to the invention the case 12 comprises four inserting holes 122 arranged side by side and one above the other and one inserting hole 122 arranged below and at an intermediate position of the four inserting holes 122, and the case 12 further comprises a required number of sliders 120 arranged substantially at an intermediate position of the four inserting holes 122 arranged side by side and forming parts of the five inserting holes 122, and a holder 118 for movably holding the slider 120, thereby preventing the insertion of more than one memory card 50 into the card connector by means of the slider 120. In this manner, as the insertion of more than one memory card 50 can be prevented with a simple construction with great certainty, no errors occur in integrated circuits for controlling the memory cards 50, and the card connector according to the invention can be designed without any limitation in circuit board design and without any obstacle in high-density construction and is easy to design the case and easy to remove memory card 50.

(8) According to the invention, a combination of the recesses 130 and the protrusion 132 forms the parts of the inserting holes 122, thereby preventing the insertion of more than one memory card 50. Therefore, as the insertion of more than one memory card 50 can be prevented, no errors occur in integrated circuits for controlling the memory cards 50, and circuit board design and case design can be easily performed without any objection.

(9) According to the invention, four recesses 130 form the parts of the four inserting holes 122 arranged side by side and one above the other, and one protrusion 132 forms the part of the inserting hole 122 arranged below the four inserting holes 122. Consequently, as the insertion of more than one memory card 50 can be prevented, no errors occur in integrated circuits for controlling the memory cards 50, and circuit board design and case design can be easily performed without any objection.

(10) According to the invention, the front end of the holder 118 is divided into pieces which are alternately bent in opposite directions, and the slider 120 is formed with an inserting aperture 128 into which the holder 118 is inserted such that the slider 120 is movably held. Therefore, as the insertion of more than one memory card 50 can be prevented with a simple construction with great certainty, no errors occur in integrated circuits for controlling the memory cards 50, and circuit board design and case design can be easily performed without any objection.

(11) According to the invention, the front end of the holder 118 is divided into three pieces which are alternately bent in opposite directions, and the slider 120 is formed with a longitudinally elongate inserting aperture 128 into which the holder 118 is inserted such that the slider 120 is held movably in its longitudinal direction (direction of the thickness of the connector). Consequently, as the insertion of more than one memory card 50 can be prevented with a simple construction with great certainty, no errors occur in integrated circuits for controlling the memory cards 50, and circuit board design and case design can be easily performed without any objection.

(12) According to the invention, a combination of the recesses 130 and the protrusion 132 formed in the slider 120 forms the parts of the inserting holes 122 for memory cards 50 so that when the slider 120 is moved by inserting one memory card 50 into one inserting hole 122, any memory card cannot be inserted into any other inserting holes 122. Therefore, the slider 120 can be easily held movably onto the case 12, and only by moving the slider 120, the insertion of more than one memory card 50 can be prevented, with the result that no errors occur in integrated circuits for controlling the memory cards 50, and circuit board design and case design can be easily performed without any objection.

The invention will be more fully understood by referring to the following detailed specification and claims taken in connection with the appended drawings.

DESCRIPTION OF THE PREFERRED EMBODIMENTS

Figure 1A:
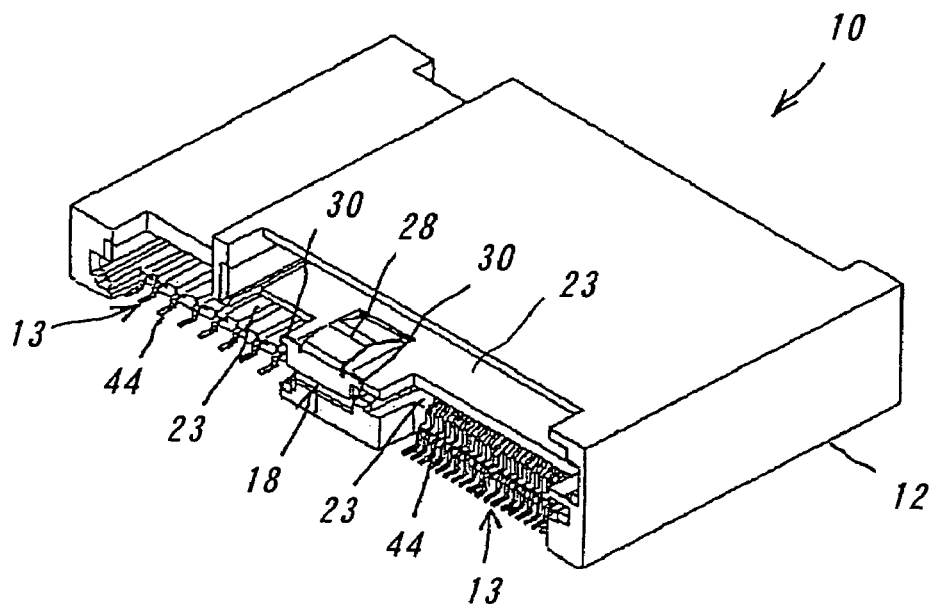
FIG. 1A is a perspective view of a card connector viewed from above on the fitting side.
Figure 1B:
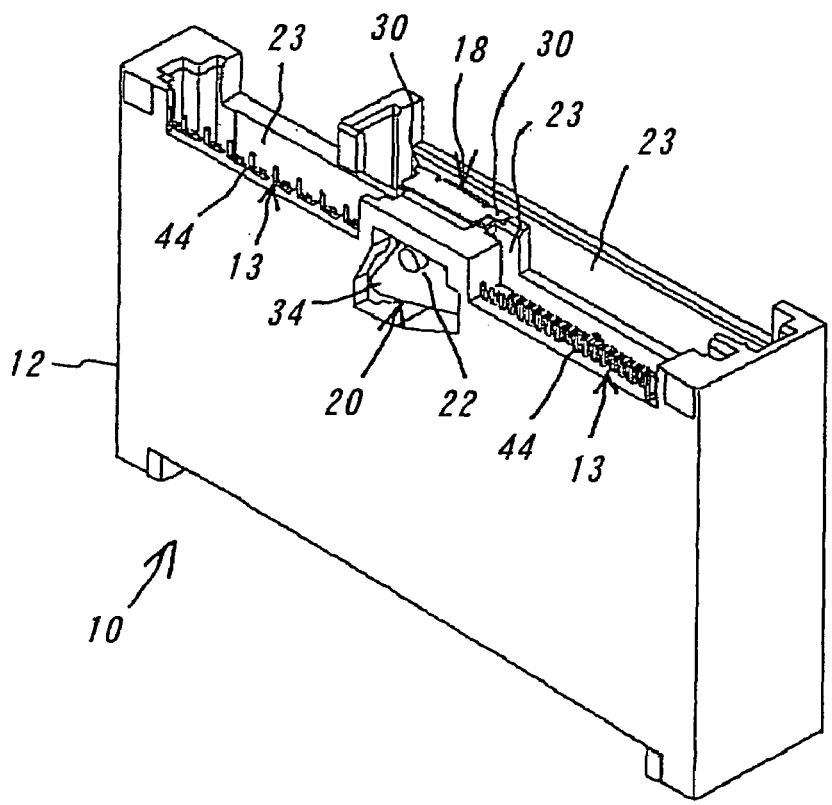
FIG. 1B is the perspective view of the card connector viewed from below on the fitting side.
Figure 2:
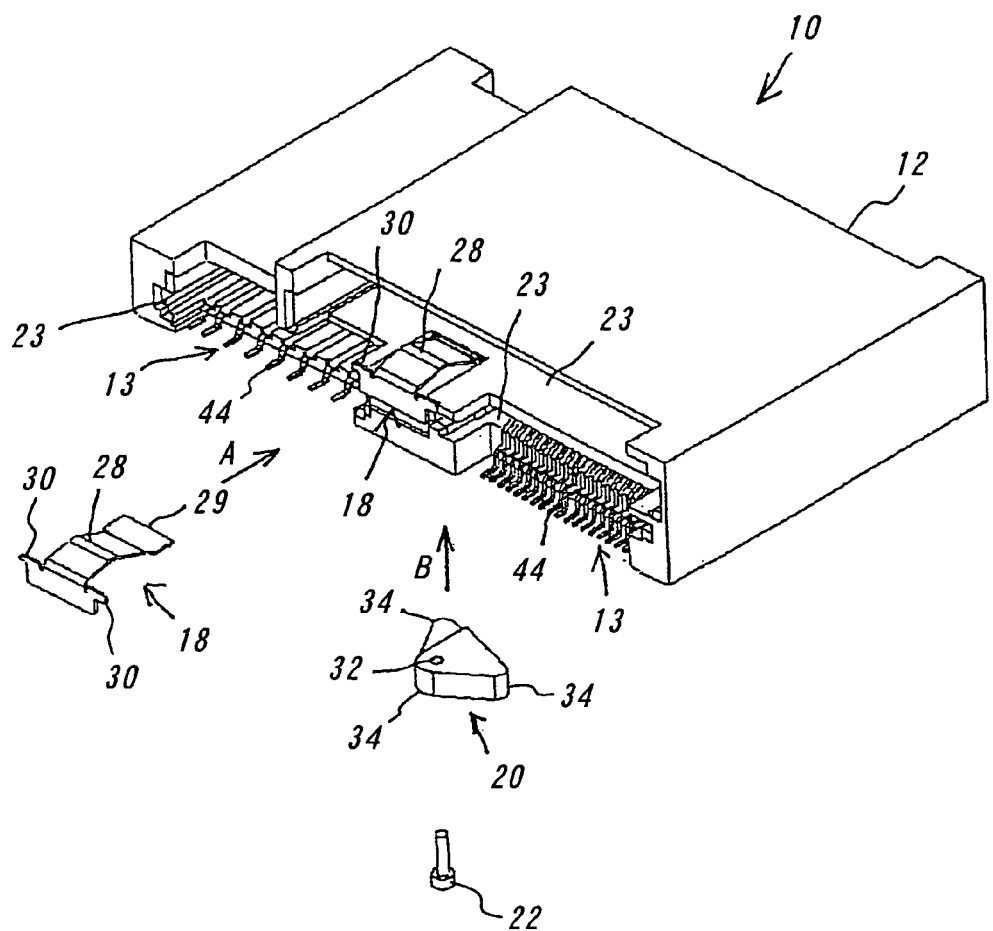
FIG. 2 is a view for explaining mounting of a spring member and a locking member onto the card connector according to the invention.
Figure 3:
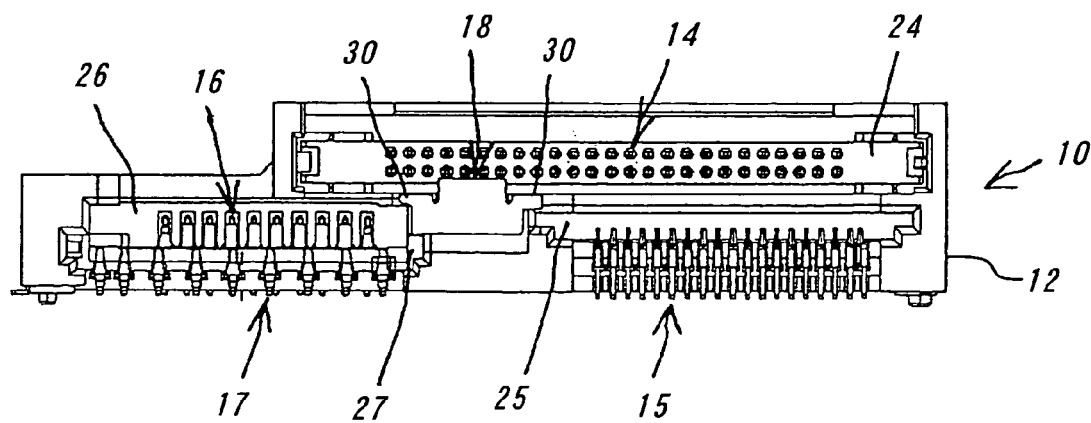
FIG. 3 is a front view for explaining an occasion inserting a plurality of memory cards into the card connector according to the invention.
Figure 4:
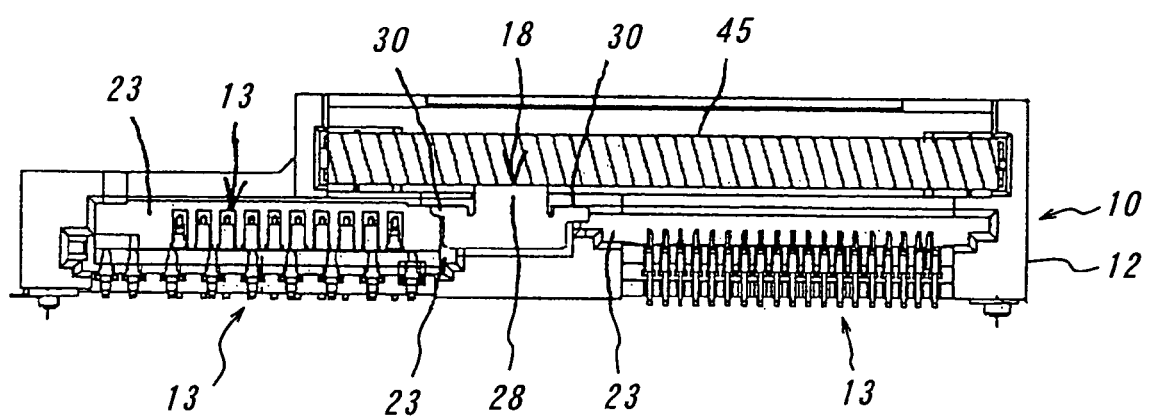
FIG. 4 is a front view for explaining the card connector with a memory card inserted into an inserting hole arranged in the upper portion.
Figure 5A:
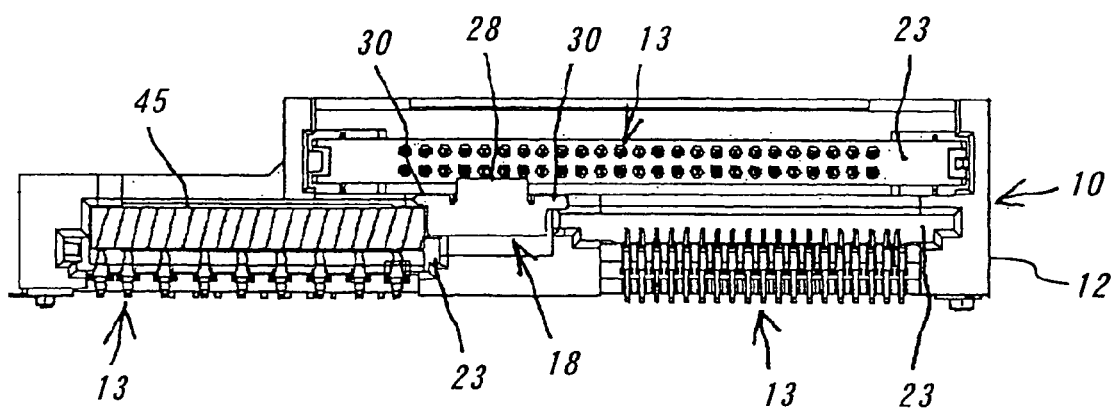
FIG. 5A is a front view for explaining the card connector with a memory card inserted into an inserting hole on one side in the lower portion.
Figure 5B:
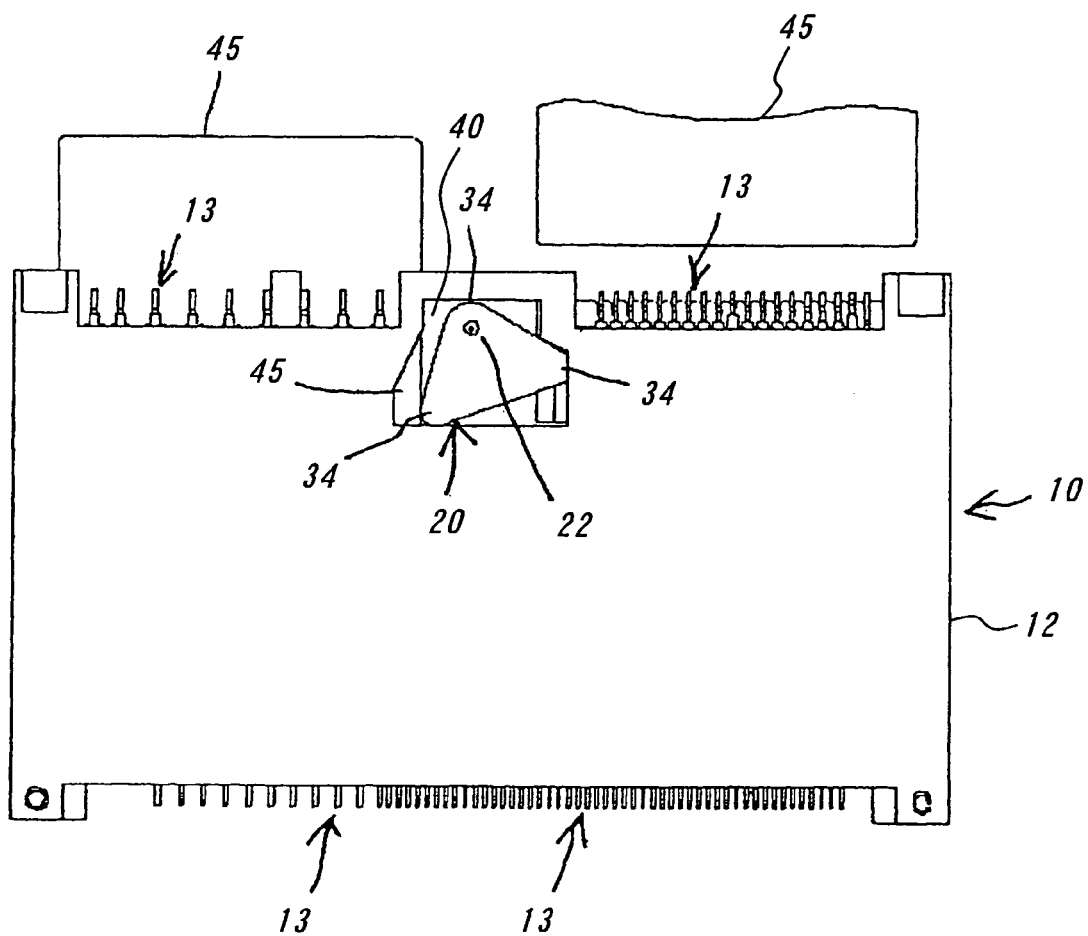
FIG. 5B is a bottom plan view of the card connector shown in FIG. 5A.
Figure 6:
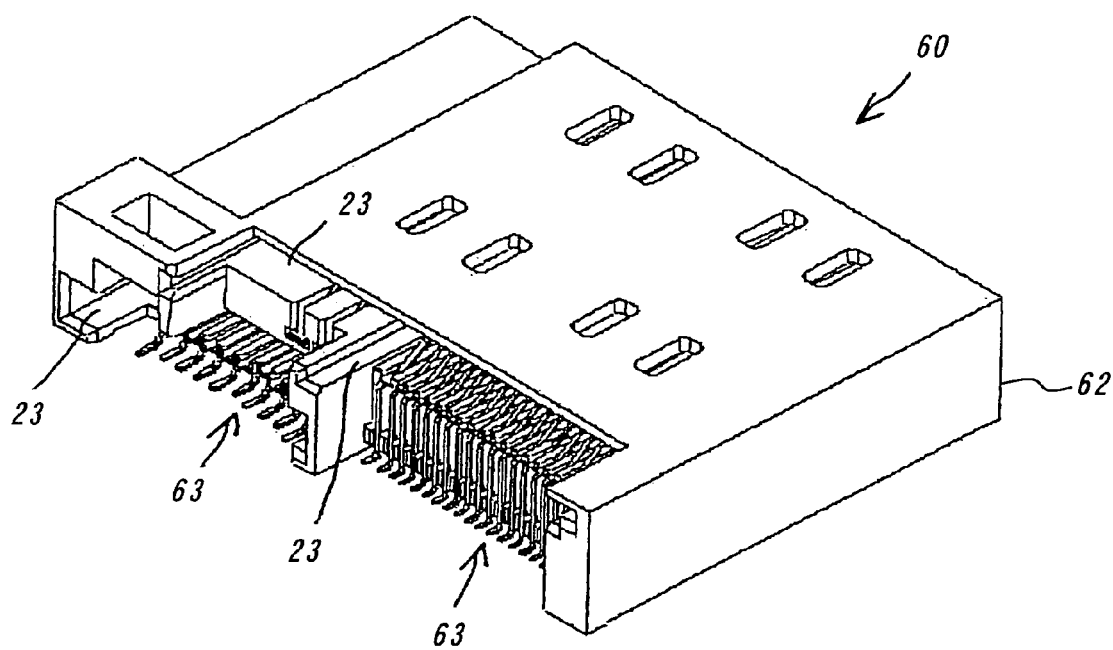
FIG. 6 is a perspective view of a card connector of the prior art viewed from above on the fitting side.
Figure 7:
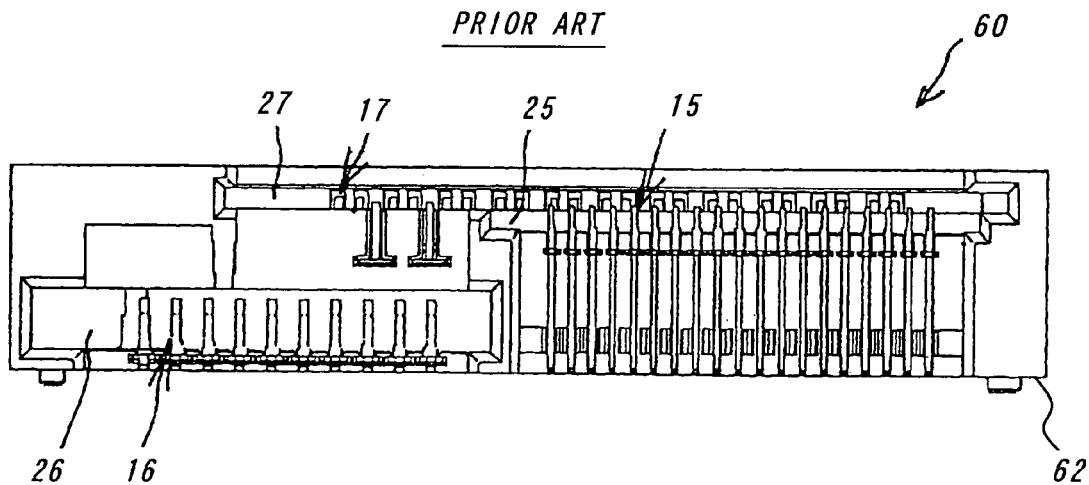
FIG. 7 is a front view for explaining an occasion inserting a plurality of memory cards into the card connector of the prior art.

One embodiment of the card connector according to the invention will be explained with reference to FIGS. 1 to 5. FIG. 1A is a perspective view of the card connector according to the invention viewed from above on its fitting side and FIG. 1B is a perspective view of the card connector according to the invention viewed from below on the fitting side. FIG. 2 is a view for explaining mounting of a spring member and a locking member on the card connector according to the invention. FIG. 3 is a front view for explaining the occasion inserting a plurality of memory cards into the card connector according to the invention. FIG. 4 is a front view for explaining the card connector with a memory card inserted in one inserting hole in the upper portion of the card connector. FIG. 5A is a front view for explaining the card connector with a memory card inserted in one inserting hole on one side in the lower portion of the card connector and FIG. 5B is a bottom plan view of the connector in FIG. A.

The card connector 10 of the one embodiment of the invention mainly comprises a case 12, contacts 13 of many kinds, a locking member 20 and a spring member 18.

First, the locking member 20 will be explained, which is a subject matter of the invention. The locking member 20 is injection molded from an electrically insulating plastic material in the conventional manner. The material for the locking member 20 is suitably selected in consideration of dimensional stability, workability, manufacturing cost and the like. In general, preferred materials from which to form the locking member 20 include polybutylene terephthalate (PBT), polyamide (66 PA or 46 PA), liquid crystal polymer (LCP), polycarbonate (PC) and the like and combinations thereof.

The locking member 20 is substantially in the form of a triangular plate which is formed near its one vertex 34 with an aperture 32 into which a fixation pin 22 is inserted. The locking member 20 is rotatable about the aperture 32 (the fixation pin 22) when the locking member 20 is mounted on the case 12 by means of the fixation pin 22. In other words, there is a clearance between the aperture 32 and the fixation pin 22 to permit rotation of the locking member 20 relative to the case 12. In the case that a memory card 45 is inserted in either of inserting holes 23 arranged side by side in the case 12 for memory cards as shown in FIGS. 5A and 5B, the inserted memory card 45 abuts against one vertex 34 of the locking member other than the vertex 34 formed with the aperture 32 so that the locking member 20 is pivotally moved to cause the remaining vertex 34 to extend into another inserting hole 23. In this manner, as a function of the locking member 20, a memory card is prevented from being inserted into the inserting holes 23 other than that into which the memory card 45 has already been inserted. The size of the locking member 20 is suitably designed in consideration of its function, the size of the card connector 10, a spacing between the inserting holes arranged in side by side, and the like. The locking member 20 is inserted into the case 12 in the direction shown by an arrow B and fixed thereto.

While the locking member 20 is of the substantially triangular plate and pivotally mounted on the case 12 in the above explanation, it is to be understood that the locking member 20 may have other features insofar as it can perform the function described above. For example, the locking member may be a substantially rectangular plate which may be formed with an aperture 32 at its center and the aperture 32 may be elliptical so that the rectangular locking member may be laterally moved without being pivotally moved. In more detail, when a memory card 45 is inserted into one of inserting holes 23 arranged side by side, the inserted memory card laterally pushes the locking member 20 so that the locking member 20 moves laterally to partly extends into another inserting hole 23, thereby preventing a memory card from being inserted into the another inserting hole 23.

The spring member 28 will be explained, which is another subject matter of the invention. The spring member 18 is made of a metal and formed by the press-working in the conventional manner. Preferred materials from which to form the spring member 18 include brass, beryllium copper, phosphor bronze and the like to fulfil the requirements imposed thereon, such as springiness, formability and the like. The spring member 18 is substantially L-shaped and includes a fixed portion 29 to be fixed to the case 12, an elastic portion 28 and two extending portions 30 extending in both width directions. The spring member 18 is inserted in the direction shown by an arrow A in FIG. 2 between the inserting holes 23 provided side by side in the lower portion of the connector as shown in FIGS. 1A and 1B and fixed thereto such that the elastic portion 28 of the spring member 18 extends into the inserting hole 23 in the upper portion of the connector. The spring member 18 is fixed to the case 12 by press-fitting, lancing (hooking) or the like.

The spring member 18 functions in the following manner. When a memory card 45 is inserted into the inserting hole 23 in the upper portion of the connector, the memory card 45 presses the elastic portion 28 of the spring member 18 downward to cause the spring member 18 to displace downward so that the two extending portions 30 of the spring member 18 extend into the inserting holes 23 arranged side by side in the lower portion of the connector, thereby preventing a memory card 45 from being inserted into the inserting holes 23 in the lower portion under the condition that the memory card has been already inserted in the inserting hole in the upper portion of the connector.

The spring member 18 further functions in the following manner. When a memory card 45 is inserted in either of the inserting holes 23 arranged side by side in the lower portion of the connector, the extending portion 30 of the spring member 18 abuts the inserted memory card 45 to preclude the displacement of the elastic portion 28 of the spring member 18, thereby making it impossible to insert a memory card 45 into the inserting hole 23 in the upper portion of the connector.

The displacement of the elastic portion 28 of the spring member 18 may be suitably designed in consideration of its functions. The displacement is 1.05 mm in the illustrated embodiment. Moreover, the shape and size of the extending portions 30 of the spring member 18 may be suitably designed in consideration of the functions described above. The size of the extending portions 30 is 0.8 mm in the illustrated embodiment.

Although when a memory card 45 has been inserted into the inserting hole in the upper portion of the connector, the insertion of a memory card 45 into the inserting holes 23 arranged side by side in the lower portion of the connector is prevented by the spring member 18 in the illustrated embodiment, it is to be understood that spring members 18 may be arranged in the respective inserting holes 23 arranged side by side in the lower portion of the connector to cause the spring members 18 to perform the functions described above. In that case, the extending portions 30 of the spring members 18 may be provided in the direction of the displacement, not in the direction of the width.

The case 12 will then be explained. The case 12 is injection molded from an electrically insulating plastic material in the conventional manner. The material for the case member 12 is suitably selected in consideration of dimensional stability, workability, manufacturing cost and the like. In general, preferred materials from which to form the case 12 include polybutylene terephthalate (PBT), polyamide (66 PA or 46 PA), liquid crystal polymer (LCP), polycarbonate (PC) and the like and combinations thereof.

The case 12 is formed with a required number of inserting holes 23 for a plurality of memory cards 45, respectively. The inserting holes 23 are shaped and sized to commensurate with the respective memory cards 45. Kinds of the memory cards 45 to be inserted into the inserting holes 23 in the embodiment will be explained referring to FIG. 3. The inserting hole 24 in the upper portion of the connector is for a CF card 46, while the inserting hole 25 on the right side in the lower portion is for an xD card 47. The two inserting holes 26 and 27 arranged on the left side in the lower portion have some common cards to be inserted, and for an MS card 48 and an SD card or an MM card 49.

The case 12 is formed with inserting grooves 36 for locating a plurality of contacts 13 fixed therein by press-fitting, hooking (lancing), welding or the like.

The case 12 is formed with an inserting aperture 38 for fixing the spring member 18 therein. The position of the inserting aperture 38 may be suitably designed in consideration of the functions of the spring member 18, the strength of the insulating body of the case 12, the miniaturization of the connector 10 and the like. In the illustrated embodiment, the spring member is provided between the inserting holes 23 arranged side by side in the lower portion of the connector as described above and shown in FIG. 2. The size of the inserting aperture 38 may be designed in consideration of the holding force of the spring member 18.

Moreover, the case 12 is formed with a mounting hole 40 for mounting the locking member 20. The position of the mounting hole 40 may be suitably designed in consideration of the functions of the locking member 20, the strength of the insulating body of the case 12, the miniaturization of the connector 10 and the like. In the illustrated embodiment, the mounting hole 40 is provided between the inserting holes 23 arranged side by side and on the lower side of the connector 10 as described above and shown in FIG. 2. The size of the mounting hole 40 may be designed in consideration of the shape of the locking member 20 and the strength of the insulating body of the case 12 such that the locking member is pivotally movable or displaceable. Moreover, there is provided a fixing aperture in the mounting hole 40 for receiving the fixation pin 22 for mounting the locking member 20 onto the case 12.

The plurality of the contacts 13 will then be explained. The plurality of the contacts 13 are made of a metal and formed by the press-working in the conventional manner. Preferred materials from which to form the contacts 13 include brass, beryllium copper, phosphor bronze and the like to fulfil the requirements imposed thereon, such as springiness, conductivity and the like.

The plurality of contacts 13 each include a contact portion 42 adapted to contact the connection portion of a memory card 45, a fixed portion to be fixed to the case 12, and a connection portion 44 to be connected to a board or substrate. As the case 12 has a plurality of inserting holes 23, among the plurality of contacts 13, CF card contacts 14, xD card contacts 15, MS card contacts 16, and SD or MM card contacts 17 are fixed at predetermined positions. The connection portions 44 of the respective contacts 14, 15, 16 and 17 may be suitably designed in consideration of the circuit design of a substrate, occupied areas, the size and design of the connector 10. In the illustrated embodiment, the connection portions 44 of the CF card contacts 14 are arranged on the opposite side of the entry of the inserting hole 23, while the connection portions 44 of the xD card contacts 15 are arranged on the entry side of the inserting hole 23. The connection portions 44 of the MS card contacts 16 are arranged on the opposite side of the entry of the inserting hole 23, while the connection portions 44 of the SD or MM card contacts 17 are arranged on the entry side of the inserting hole 23.

Finally, the functions of the locking member 20 and the spring member 18 will be again explained with reference to FIGS. 4 and 5.

First, the case that the memory card 45 has been inserted in the inserting hole in the upper portion of the connector will be explained. When the memory card 45 is inserted into the inserting hole 23 in the upper portion of the connector as shown in FIG. 4, the memory card 45 causes the elastic portion 28 of the spring member 18 to be displaced downward so that the extending portions 30 of the spring member 18 extend into the inserting holes 23 arranged side by side in the lower portion of the connector, thereby preventing a memory card from being inserted into the inserting holes 23 in the lower portion of the connector.

Next, the case that a memory card 45 has been inserted into either of the inserting holes in the lower portion of the connector will be explained. When the memory card 45 is inserted into the inserting hole 23 on the left side in the lower portion, the memory card 45 causes the locking member 20 to be pivotally moved as shown in FIG. 5B so that part of the locking member 20 extends into the inserting hole 23 on the right side in the lower portion, thereby preventing a memory card 45 from being inserted into the inserting hole 23 on the right side in the lower portion. At the same time, the memory card 45 inserted in the inserting hole 23 on the left side in the lower portion prevents the spring member 18 from being displaced (that is, the memory card 45 prevents the extending portion 30 of the spring member 18 from lowering so that the elastic portion 28 of the spring member 18 could not be displaced), thereby preventing a memory card 45 from being inserted into the inserting hole 23 in the upper portion of the connector.

While the card connector 10 including the case 12 provided with the three inserting holes 23 for memory cards are explained and illustrated in the above embodiment, it will be apparent that the number of the inserting holes is not limited. With a combination of plural members having the constructions of the spring members 18 and the locking member 20 described above, it is possible to suitably design a card connector capable of preventing a memory card from being inserted after one memory card has been inserted into the card connector.

Figure 8:
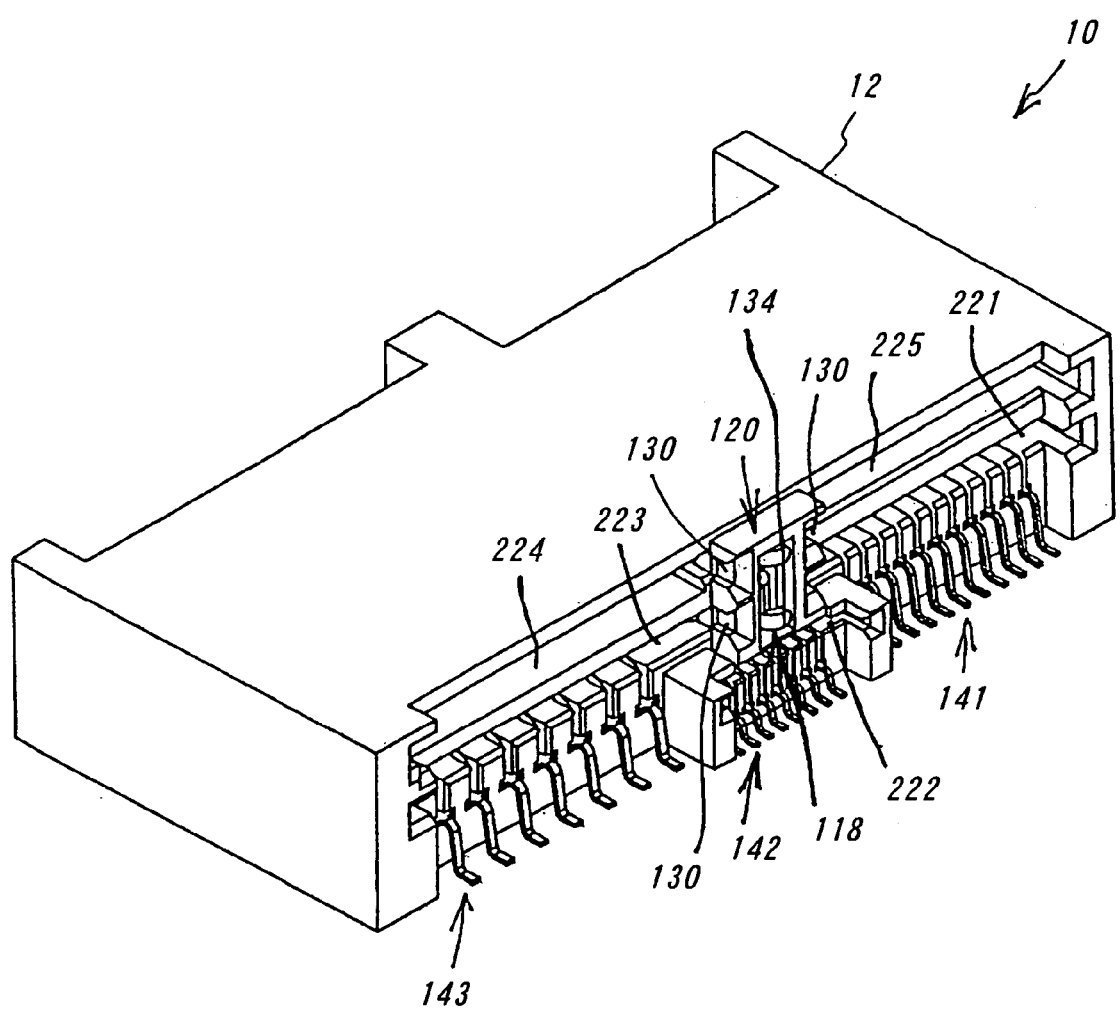
FIG. 8 is a perspective view of a card connector according to a further embodiment of the invention viewed from above on the fitting side.
Figure 9:
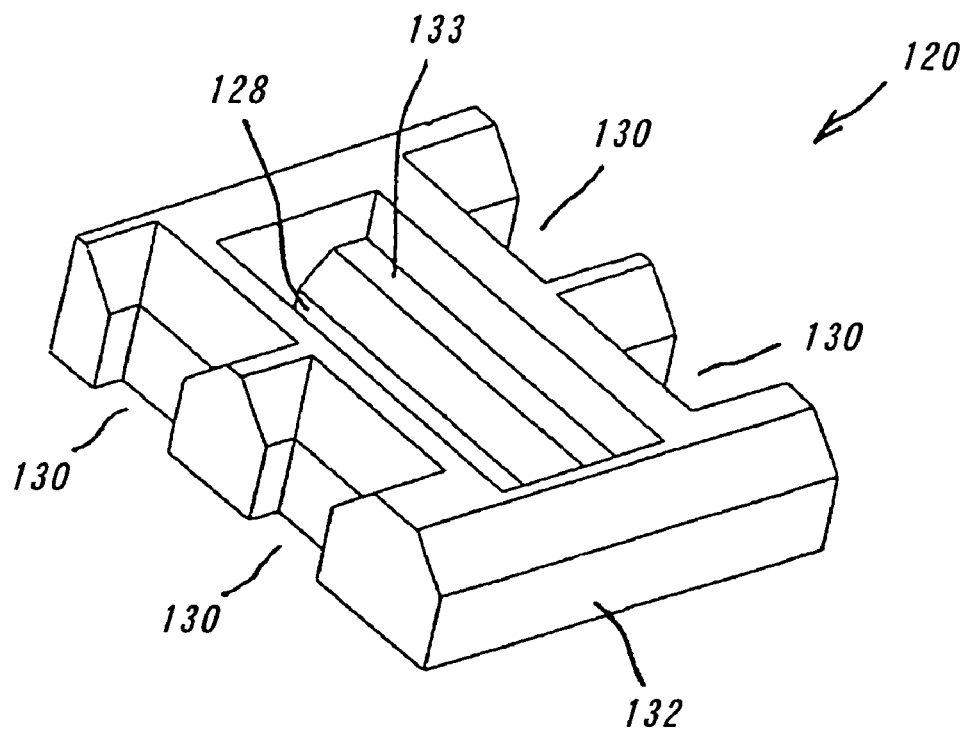
FIG. 9 is a perspective view of a slider and a holder used in the card connector of the embodiment.
Figure 9:
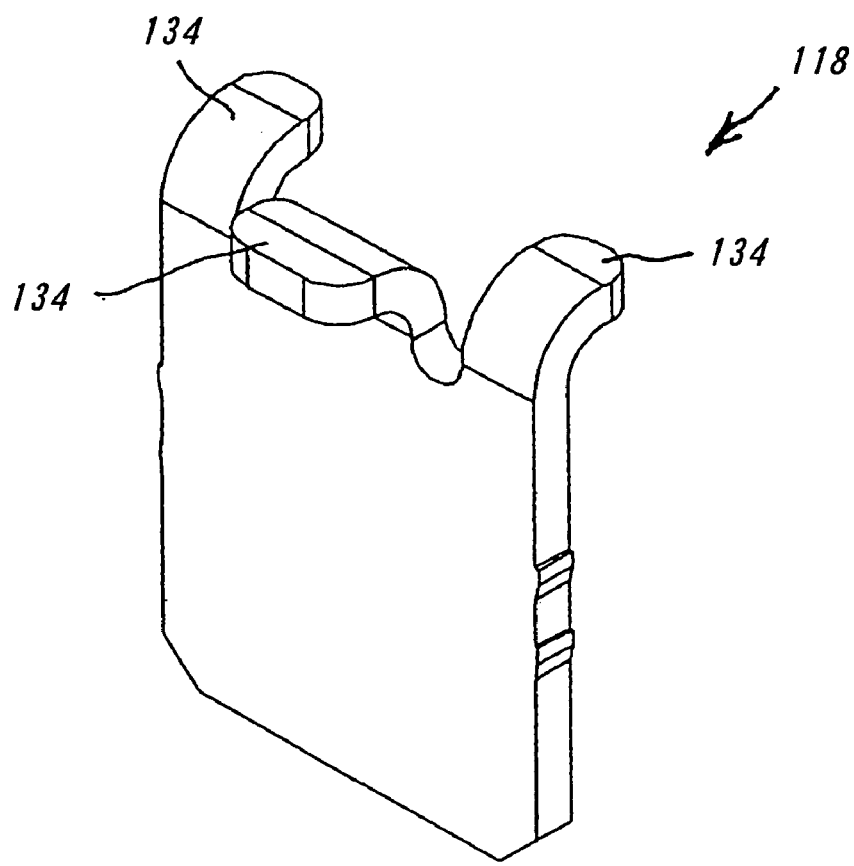
Figure 10:
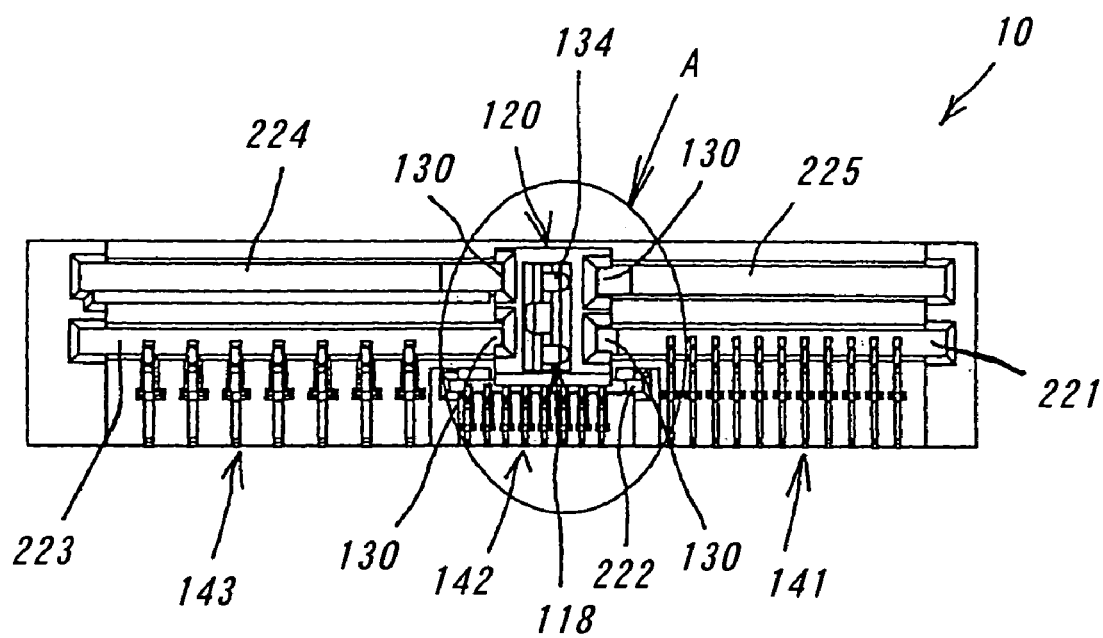
FIG. 10 is a front view of the card connector of the embodiment of the invention.

Another embodiment of the card connector according to the invention will then be explained with reference to FIGS. 8 to 11. FIG. 8 is a perspective view of the card connector viewed from above on the fitting side. FIG. 9 is a perspective view of a slider and a holder. FIG. 10 is a front view of the card connector according to the embodiment. FIGS. 11A to 11D are enlarged views of the part A in FIG. 10 for explaining the states of the slider when memory cards are inserted into respective inserting holes.

The card connector 10 of this embodiment mainly comprises a case 12, contacts 13 of many kinds, a slider 120, and a holder 118.

First, the case 12 will be explained. The case 12 is formed with a required number of inserting holes 122 for inserting memory cards 50. In this embodiment, the case has a construction enabling five memory cards 50 to be inserted. The shapes and sizes of the inserting holes 122 may be designed commensurate with those of the respective memory cards 50. The kinds of the memory cards 50 to be inserted into the inserting holes 122 in this embodiment will be explained. Among these five inserting holes 122, four inserting holes 221, 223, 224 and 225 are arranged substantially side by side and one above the other and the remaining one inserting hole 222 is arranged below and at an intermediate position of the four inserting holes. An SD or MMC card 504 is inserted into the inserting hole 224 arranged uppermost on the left side, and an RS or MMC card 503 is inserted into the inserting hole 223 arranged immediately below the inserting hole 224. A Memory-Stick Duo card 505 is inserted into the inserting hole 225 arranged uppermost on the right side, and A Mini SD card 501 is inserted into the inserting hole 221 arranged immediately below the inserting hole 225. A Transflash card 502 is inserted into the inserting hole 222 arranged below and at the intermediate position of the four inserting holes.

Moreover, the case 12 is formed with inserting grooves 126 in which contacts 13 of plural kinds corresponding to the respective cards 50 are mounted and fixed by press-fitting, hooking (lancing), welding, or the like.

The case 12 is formed with a fixation hole 124 for fixing the holder 118 therein. The position of the fixation hole 124 may be suitably designed in consideration of functions of the holder 118 described later, the strength of the case 12, the miniaturization of the connector 10 and the like. In the present embodiment, the fixation hole 124 is provided substantially at the intermediate position of the four inserting holes 221, 223, 224 and 225 arranged side by side and one above the other (substantial at the center of the connector in its longitudinal direction). The size of the fixation hole 124 for the holder 118 may be suitably designed in consideration of the holding force of the holder 118 for the slider 120.

The slider 120 will then be explained, which is a subject matter of this embodiment. The slider 120 is injection molded from an electrically insulating plastic material in the conventional manner. The material for the slider 120 is suitably selected in consideration of dimensional stability, workability, manufacturing cost and the like. In general, preferred materials from which to form the slider 120 include polybutylene terephthalate (PBT), polyamide (66 PA or 46 PA), liquid crystal polymer (LCP), polycarbonate (PC) and the like and combinations thereof. Moreover, the slider may be formed of a metal, insofar as it fulfils the requirements for exhibiting the functions of the slider. In that case, preferred metals are substantially the same as those for the holder.

The slider 120 is substantially rectangular, and formed with an elongate inserting aperture 128 substantially at the center in the width direction. With this elongate inserting aperture 128, the slider 120 is movable in its longitudinal direction (in the direction of the thickness of the connector). The holder 118 is inserted in the inserting aperture 128 and in that state the slider 120 is movable relative to the holder 120 fixed in the case 12. The shape and size of the inserting aperture 128 need only be sufficient to permit the holder 118 to be inserted and the slider 120 to be movable, and may be suitably designed in consideration of such functions and strengths and the like. In the present embodiment, the inserting aperture 128 is 0.1 to 0.3 mm larger than the holder 118.

The slider 120 is formed with anchoring portions 133 at peripheries of the inserting aperture 128, which are adapted to engage fixation pieces 134 of the holder 118 as shown in FIG. 9. The shape and size of the anchoring portions 133 adapted to engage the fixation pieces 134 may be suitably designed such that the slider 120 is movable and the fixation pieces 134 do not extend from the slider 120.

The slider 120 is provided with required numbers of recess 130 and protrusion 132, and the combination of these recesses 130 and protrusion 132 forms parts of the inserting holes 122 of the case 12. In other words, in this embodiment, the slider 120 is provided with four recesses 130 and one protrusion 132, and four recesses 130 each form part of the inserting hole 221, 223, 224 and 225 arranged side by side and one above the other, and the one protrusion 132 forms part of the inserting hole 222 arranged below and at an intermediate position of the four inserting holes. The sizes of the recesses 130 and the protrusion 132 may be suitably designed such that when one memory card 50 is inserted into one inserting hole, the slider 120 is moved, with the result that the other recesses and protrusion partly extend into other inserting holes into which any memory card is not yet inserted, thereby preventing other memory card from being inserted into these inserting holes.

The holder will then be explained, which is another subject matter of the embodiment. The holder 118 is made of a metal and formed by the press-working in the conventional manner. Preferred metals from which to form the holder include brass, beryllium copper, phosphor bronze and the like to fulfil the requirements imposed thereon, such as dimensional stability, formability and the like. An electrically insulating plastic material may be used for the holder insofar as it fulfils the requirements for exhibiting the function of the holder described below. In that case, preferred plastic materials are substantially the same as those for the slider.

The holder 118 is substantially plate-shaped and comprises a fixation portion adapted to be fixed in the fixation hole 124 of the case 12 and the fixation pieces 134 movably holding the slider 120 and adapted to engage the slider 120. The holder 118 is fixed to the case 12 by press-fitting or hooking. The holder 118 has a function movably holding the slider 120.

In order to hold the slider 120 movably, the holder 118 is provided at its front end with three fixation pieces 134 which are formed by dividing the front end of the holder into three pieces and bending the pieces alternately in opposite directions. The slider 120 is movably held on the case by the engagement of the fixation pieces 134 with the slider 120. The shape, size and number of the fixation pieces 134 may be suitably designed such that the fixation pieces 134 can engage the slider 120 and the slider 120 is movably held on the case 12. In this embodiment, the front end of the holder 118 is divided into the three fixation pieces 134 in consideration of stability of movement.

The plurality of the contacts 13 will then be explained. The contacts 13 each include a contact portion adapted to contact the connection portion of a memory card 50, a fixed portion to be fixed to the case 12, and a connection portion to be connected to a board or substrate. As the case 12 has a plurality of inserting holes 122, among the plurality of contacts 13, MiniSD card contacts 141, Transflash card contacts 142, RS or MMC card contacts 143, SD or MMC card contacts 144, and Memory-Stick Duo card contacts 145 are fixed at predetermined positions. The connection portions of the respective contacts 141, 142, 143, 144 and 145 may be suitably designed in consideration of the circuit design of a substrate, occupied areas, the size and design of the connector 10. In the illustrated embodiment, the connection portions of the SD or MMC card contacts 144 and the Memory-Stick Duo card contacts 145 are arranged on the opposite side of the entry of the inserting hole 122, while the connection portions of the MiniSD card contacts 141, the Transflash card contacts 142, and the RS or MMC card contacts 143 are arranged on the side of the entry of the inserting holes 122.

Moreover, the contact portions of the contacts 141, 142, 143, 144 and 145 each extend into the respective inserting hole so as to be able to contact a memory card 50 inserted in the inserting hole 122. The positions of the contact portions of the contacts are each designed in consideration of the position of the connection portion of the memory card 50 to be inserted, while the extending heights of the contacts are each suitably designed in consideration of contact pressure with a memory card 50.

Figure 11A:
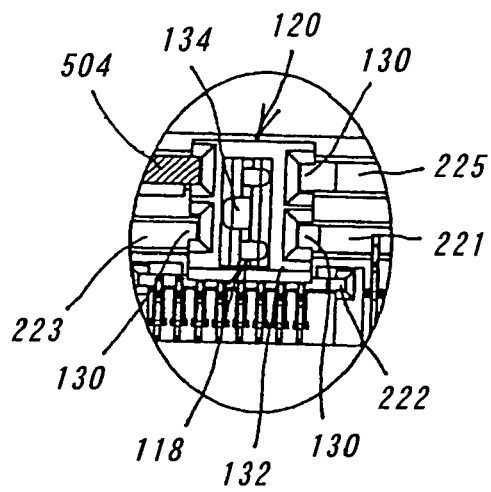
FIGS. 11A to 11E are enlarged views of the part A in FIG. 10 for explaining states of the slider when a memory card has been inserted into each of the inserting holes of the card connector.

Finally, functions of the slider 120 will be explained with reference to FIGS. 11A to 11E. First, when an SD or MMC card 504 is inserted into the inserting hole 224 arranged uppermost on the left side as shown in FIG. 11A, the SD or MMC card 504 is also inserted into the recess 130 of the slider 120 forming the part of the inserting hole 224 arranged uppermost on the left side so that the slider 120 is moved upward or downward, and the other recesses 130 and the protrusion 132 extend into the other inserting holes 221, 222, 223 and 225.

Figure 11B:
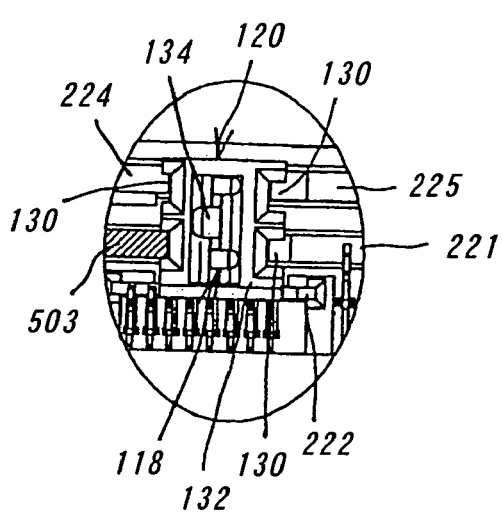

Next, when an RS or MMC card 503 is inserted into the inserting hole 223 immediately under the inserting hole 224 arranged uppermost on the left side as shown in FIG. 11B, the RS or MMC card 503 is also inserted into the recess 130 forming the part of the inserting hole 223 so that the slider 120 is moved upward or downward, and the other recesses 130 and the protrusions 132 extend into the other inserting holes 221, 222, 224 and 225.

Figure 11C:
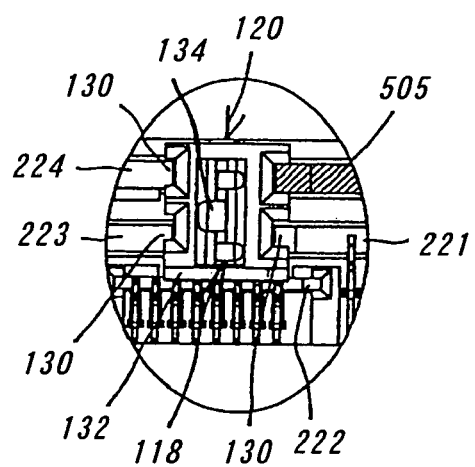

Next, when a Memory-Stick Duo card 505 is inserted into the inserting hole 225 arranged uppermost on the right side as shown in FIG. 11C, the Memory-Stick Duo card 505 is also inserted into the recess 30 forming the part of the inserting hole 225 so that the slider 120 is moved upward or downward, and the other recesses 130 and the protrusion 132 extend into the other inserting holes 221, 222, 223 and 224.

Figure 11D:
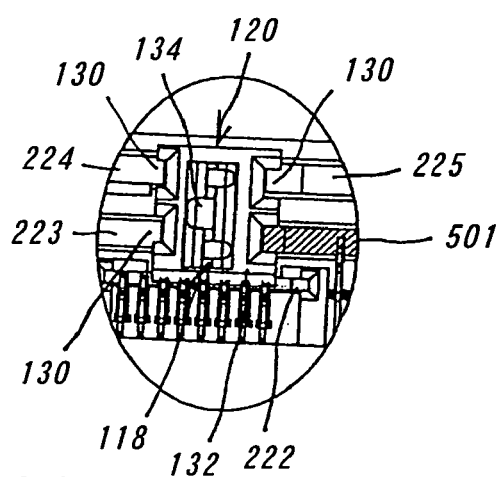
Figure 11E:
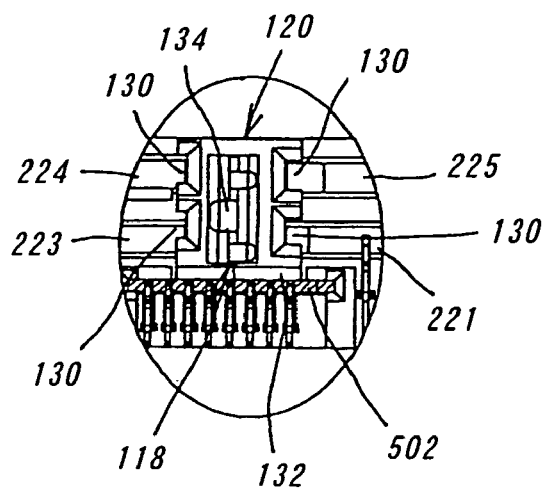

Next, when a Mini SD card 501 is inserted into the inserting hole 221 immediately under the inserting hole 225 arranged uppermost on the right side as shown in FIG. 11D, the Mini SD card 501 is also inserted into the recess 30 forming the part of the inserting hole 221 so that the slider 120 is moved upward or downward, and the other recesses 130 and the protrusions 132 extend into the other inserting holes 222, 223, 224 and 225.

Finally, when a Transflash card 502 is inserted into the inserting hole 222 arranged in the lowermost and at the intermediate position of the four upper inserting holes, the protrusion 132 of the slider 120 is moved upward by the Transflash card 502 inserted in the inserting hole 222 so that the recesses 130 extend into the other inserting holes 221, 223, 224 and 225.

While the card connector 10 including the case 12 provided with five inserting holes 122 for memory cards are explained and illustrated in this embodiment, it will be apparent that the number of the inserting holes is not limited. With the combination of plural members having the constructions of the slider 120 and the holder 118 described above, it is possible to design suitably a card connector capable of preventing a memory card from being inserted after one memory card 50 has been inserted into the card connector.

The present invention is applicable to card connectors for use in a wide variety of electric and electronic appliances such as a printer, card reader and the like and particularly to a card connector which must be capable of preventing the insertion of more than one memory card.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A card connector into which a plurality of memory cards are removably inserted, including a required number of contacts adapted to contact connection portions of the plurality of the memory cards, and a case arranging and holding said contacts therein and having a plurality of inserting holes into which said plurality of memory cards are inserted, respectively,
wherein said case comprises two inserting holes arranged substantially side by side and one inserting hole arranged above said two inserting holes, and said case further comprises a locking member provided at an intermediate position of said two inserting holes to be movable or pivotally movable when a memory card is inserted into either of said two inserting holes, and a spring member provided at a position below said one inserting hole arranged above said two inserting holes to be displaceable when a memory card is inserted into said one inserting hole, thereby preventing more than one memory card from being inserted into the card connector by means of said locking and spring members.

2. The card connector as set forth in claim 1, wherein said inserting holes have a common portion to other inserting holes, if required.

3. The card connector as set forth in claim 1, wherein when a memory card is inserted into either of said inserting holes of said case, said locking member is moved or pivotally moved to extend into the inserting hole arranged in the side by side relationship to said inserting hole into which the memory card has been inserted so that said spring member is prevented from being displaced by means of said locking member, thereby preventing more than one memory card from being inserted into the card connector.

4. The card connector as set forth in claim 1, wherein when a memory card is inserted in either of said inserting holes of said case, said spring member is displaced so that parts of the displaced spring member extend into other inserting holes, thereby preventing more than one memory card from being inserted into the card connector.

5. A card connector into which a plurality of memory cards are removably inserted, including a plurality of contacts adapted to contact connection portions of the plurality of the memory cards, and a case arranging and holding said contacts therein and having a plurality of inserting holes into which said plurality of memory cards are inserted, respectively, comprising:
a required number of sliders arranged at predetermined positions in said case for forming parts of the plurality of inserting holes, and a required number of holders arranged at predetermined positions in said case for movably holding said sliders, thereby preventing more than one memory card from being inserted into the card connector by means of said sliders, wherein four inserting holes are arranged side by side and one above the other, and one protusion forms a part of each of said inserting holes.

6. The card connector as set forth in claim 5, wherein each of said inserting holes comprises a recess and one or more protrusions.

7. The card connector as set forth in claim 6, wherein the front end of said holder is divided into pieces which are alternately bent in opposite directions, and said slider is formed with an inserting aperture into which said holder is inserted such that said slider is movably held.

8. The card connector as set forth in claim 5, wherein the front end of said holder is divided into three pieces which are alternately bent in opposite directions, and said slider is formed with a longitudinally elongate inserting aperture into which said holder is inserted such that said slider is held movably in its longitudinal direction (direction of the thickness of the connector).

9. The card connector as set forth in claim 5, wherein each of said sliders comprises a recess and one or more protrusions and forms a part of said inserting holes for memory cards so that when said slider is moved by inserting one memory card into one inserting hole, a memory card cannot be inserted into any other inserting hole.

10. The card connector as set forth in claim 5, wherein the front end of said holder is divided into pieces which are alternately bent in opposite directions, and said slider is formed with an inserting aperture into which said holder is inserted such that said slider is movably held.

11. A card connector into which a plurality of memory cards are removably inserted, including a plurality of contacts adapted to contact connection portions of the plurality of the memory cards, and a case arranging and holding said contacts therein and having a plurality of inserting holes into which said plurality of memory cards are inserted, respectively, wherein said case comprises four inserting holes arranged side by side and one above the other and one inserting hole arranged below and at an intermediate position of said four inserting holes, and said case further comprises a required number of sliders arranged substantially at an intermediate position of said four inserting holes arranged side by side and forming parts of said five inserting holes, and a holder for movably holding said slider, thereby preventing more than one memory card from being inserted into the card connector by means of said slider.

12. The card connector as set forth in claim 11, wherein each of said inserting holes comprises a recess and one or more protrusions.

* * * * *

UNITED STATES PATENT AND TRADEMARK OFFICE
CERTIFICATE OF CORRECTION

PATENT NO. : 7,258,578 B2
APPLICATION NO. : 11/141673
DATED : August 21, 2007
INVENTOR(S) : Hitoshi Kikuchi and Hirokazu Takahashi It is certified that error appears in the above-identified patent and that said Letters Patent is hereby corrected as shown below:

ON THE TITLE PAGE:

Item (75) Inventors:

"Hitoshi Kikuchi, Koto-ku (JP)" should read -- Hitoshi Kikuchi, Tokyo (JP) --

"Hirokazu Takahashi, Koto-ku (JP)" should read -- Hirokazu Takahashi, Tokyo (JP) --

At column 16, line 40: "other, and one protusion forms a part of each of said" should read -- other, and one protrusion forms a part of each of said --

Signed and Sealed this

Third Day of February, 2009

JOHN DOLL
*Acting Director of the United States Patent and Trademark Office*